(12) United States Patent
Wang et al.

(10) Patent No.: US 11,601,948 B2
(45) Date of Patent: Mar. 7, 2023

(54) TECHNIQUES FOR CONFIGURING SEARCH SPACES FOR SIDELINK COMMUNICATION

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US); Junyi Li, Fairless Hills, PA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/359,018

(22) Filed: Jun. 25, 2021

(65) Prior Publication Data
US 2022/0007350 A1 Jan. 6, 2022

Related U.S. Application Data

(60) Provisional application No. 63/047,686, filed on Jul. 2, 2020.

(51) Int. Cl.
| | |
|---|---|
| *H04L 5/00* | (2006.01) |
| *H04W 72/04* | (2023.01) |
| *H04W 72/1263* | (2023.01) |
| *H04W 48/16* | (2009.01) |
| *H04W 72/08* | (2009.01) |
| *H04L 67/12* | (2022.01) |

(52) U.S. Cl.
CPC ......... *H04W 72/048* (2013.01); *H04L 5/0037* (2013.01); *H04W 48/16* (2013.01); *H04W 72/085* (2013.01); *H04W 72/1263* (2013.01); *H04L 67/12* (2013.01)

(58) Field of Classification Search
CPC .......... H04L 5/00; H04W 48/16; H04W 72/04
See application file for complete search history.

(56) References Cited

U.S. PATENT DOCUMENTS

2022/0030648 A1* 1/2022 Wang ................... H04L 5/0053

* cited by examiner

*Primary Examiner* — Sulaiman Nooristany
(74) *Attorney, Agent, or Firm* — Arent Fox, LLP

(57) ABSTRACT

Aspects of the present disclosure provide techniques for configuring a search space for sidelink communications between a plurality of user equipments (UEs). Particularly, the techniques described herein configure a search space (e.g., subset of all available sub-channels) to decode the sidelink packets (e.g., physical sidelink control channel (PSCCH) and physical sidelink shared channel (PSSCH)) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications.

26 Claims, 9 Drawing Sheets

FIG. 4A

| Subchannels | SL-CSS1 | SL-CSS2 | SL-USS1 |
|---|---|---|---|
| #9 | | | ░ |
| #8 | | ▓ | |
| #7 | | ▓ | |
| #6 | | | |
| #5 | ▨ | | |
| #4 | | | ░ |
| #3 | | | ░ |
| #2 | | ▓ | |
| #1 | ▨ | | ░ |
| #0 | ▨ | | |

TECHNIQUES FOR CONFIGURING SEARCH SPACES FOR SIDELINK COMMUNICATION

CROSS-REFERENCE TO RELATED APPLICATION(S)

The present application claims benefit of U.S. Provisional Application No. 63/047,686 entitled "TECHNIQUES FOR CONFIGURING SEARCH SPACES FOR SIDELINK COMMUNICATION" filed Jul. 2, 2020, which is assigned to the assignee hereof and hereby expressly incorporated by reference herein.

BACKGROUND

The present disclosure relates to wireless communication systems, and more particularly, to techniques for configuring search spaces for sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for configuring a search space for sidelink communications between a plurality of user equipments (UEs). Particularly, the techniques described herein configure a search space (e.g., subset of all available sub-channels) to decode the sidelink packets (e.g., physical sidelink control channel (PSCCH) and physical sidelink shared channel (PSSCH)) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications.

In one example, a method for wireless communication is disclosed. The method may include detecting, at a first user equipment (UE), a sidelink transmission from at least one second UE. The method may further include identifying a search space in available subchannels to decode based on the detection of the sidelink transmission. In some examples, the search space may be a subset of subchannels from the available subchannels. The method may further include decoding sidelink data transmitted from the at least one second UE based on identification of the search space.

In another example, an apparatus for wireless communications. The apparatus may include a memory having instructions and a processor configured to execute the instructions to detect, at a first UE, a sidelink transmission from at least one second UE. The processor may further be configured to execute the instructions to identify a search space in available subchannels to decode based on the detection of the sidelink transmission. In some examples, the search space may be a subset of subchannels from the available subchannels. The processor may further be configured to execute the instructions to decode sidelink data transmitted from the at least one second UE based on identification of the search space.

In some aspects, a non-transitory computer readable medium includes instructions stored therein that, when executed by a processor, cause the processor to perform the steps of detecting, at a first UE, a sidelink transmission from at least one second UE. The processor may further execute the instructions for identifying a search space in available subchannels to decode based on the detection of the sidelink transmission. In some examples, the search space may be a subset of subchannels from the available subchannels. The processor may further execute the instructions for decoding sidelink data transmitted from the at least one second UE based on identification of the search space.

In certain aspects, another apparatus for wireless communication is disclosed. The apparatus may include means for detecting, at a first UE, a sidelink transmission from at least one second UE. The apparatus may further include means for identifying a search space in available subchannels to decode based on the detection of the sidelink transmission. In some examples, the search space may be a subset of subchannels from the available subchannels. The apparatus may further include means for decoding sidelink data transmitted from the at least one second UE based on identification of the search space.

In another example, another method for wireless communication is disclosed. The method may include configuring, at a first UE, a search space for transmission of sidelink data to one or more second UEs, wherein the search space is a subset of subchannels from available subchannels. The method may further include transmitting a sidelink data from the first UE to the at least one second UE within the search space configured by the first UE for the at least one second UE.

In another example, an apparatus for wireless communications. The apparatus may include a memory having instructions and a processor configured to execute the instructions to configure, at a first UE, a search space for transmission of sidelink data to one or more second UEs, wherein the search space is a subset of subchannels from available subchannels. The processor may further be configured to execute the instructions to transmit a sidelink data from the first UE to the at least one second UE within the search space configured by the first UE for the at least one second UE.

In some aspects, a non-transitory computer readable medium includes instructions stored therein that, when executed by a processor, cause the processor to perform the steps of configuring, at a first UE, a search space for transmission of sidelink data to one or more second UEs, wherein the search space is a subset of subchannels from available subchannels. The processor may further execute the instructions for transmitting a sidelink data from the first UE to the at least one second UE within the search space configured by the first UE for the at least one second UE.

In certain aspects, another apparatus for wireless communication is disclosed. The apparatus may include means for configuring, at a first UE, a search space for transmission of sidelink data to one or more second UEs, wherein the search space is a subset of subchannels from available subchannels. The apparatus may further include means for transmitting a sidelink data from the first UE to the at least one second UE within the search space configured by the first UE for the at least one second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 4A and 4B are a schematic diagram of an example of resource allocation for sidelink communication search spaces in accordance with various aspects of the present disclosure;

DETAILED DESCRIPTION

Figure 1:
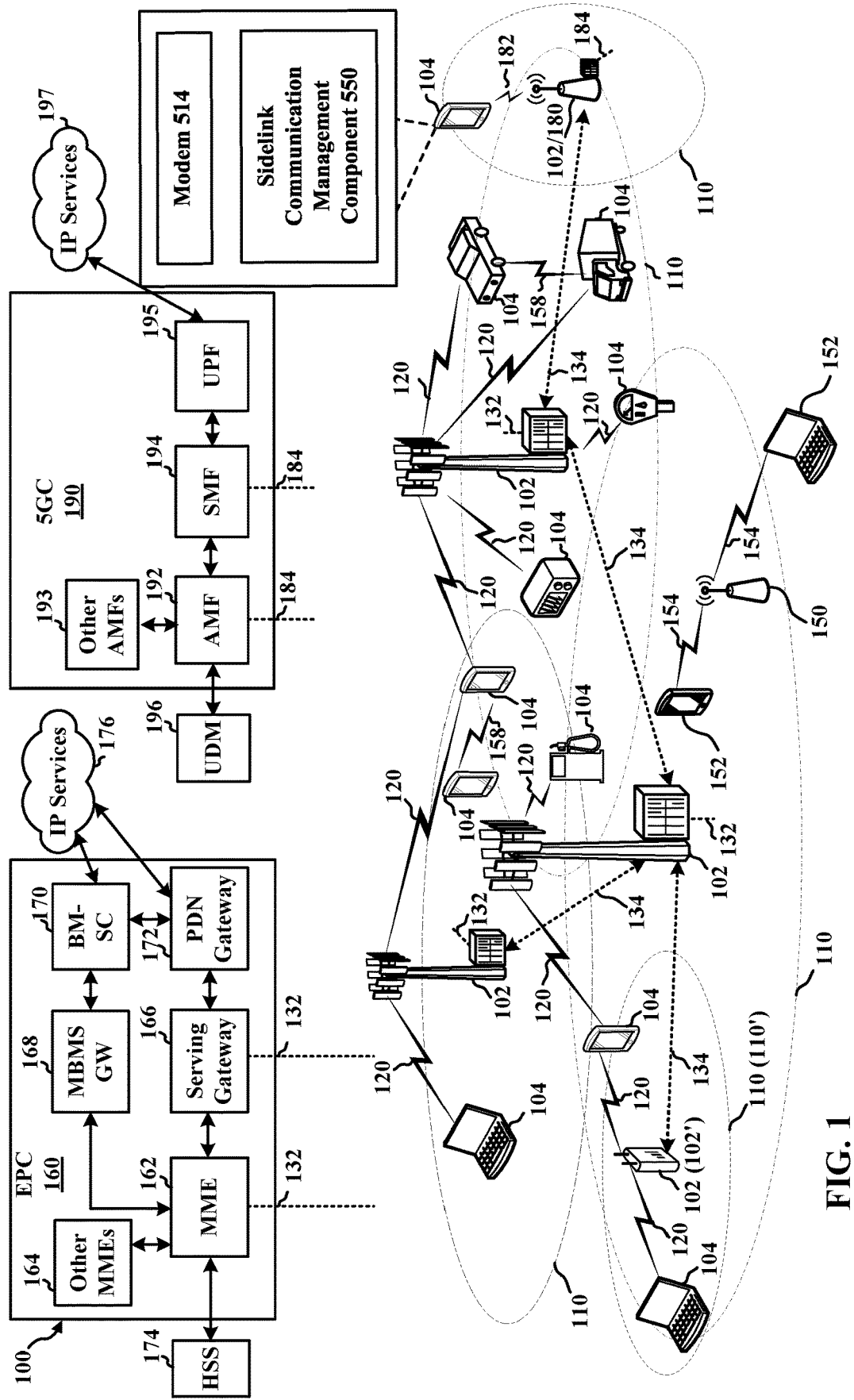
FIG. 1 is a schematic diagram of an example of a wireless communications system in accordance with aspects of the present disclosure.

In recent years, with the introduction of a myriad of smart handheld devices, user demands for mobile broadband has dramatically increased. For example, the drastic growth of bandwidth-hungry applications such as video streaming and multimedia file sharing are pushing the limits of current cellular systems. One solution to address the increased demand for bandwidth is reliance on functionalities for direct UE to UE communication (which may also be referred to as device-to-device (D2D) or sidelink communication), which allows two nearby devices (e.g., UEs) to communicate with each other in the cellular bandwidth without base station involvement or with limited base station involvement. However, introduction of D2D poses new challenges.

For example, to receive sidelink packets, a receiver UE ("Rx UE") generally performs blind decoding of all sidelink sub-channels. And while the current implementations of NR sidelink has focused on cellular vehicle-to-everything (C-V2X) technology where the number of sub-channels is typically small (e.g., 27 sub-channels), the same is not true for all applications of sidelink communications (e.g., internet of thing (IoT) devices).

Indeed, in IoT applications for instance, sidelink communications can be enabled between direct programmable logic controller (PLC) and a host of sensors/actuators (SAs). For example, a single PLC may control 20-50 SAs located on a robotic arm used for manufacturing. Because of the implementation of IoT applications, there may be tight latency (e.g., 1-2 milliseconds) and ultra-reliability requirements (e.g., $10^{-6}$ error rate) for communications between the PLC and the plurality of SAs. Thus, where the PLC is controlling the robotic arm that has 20-50 SAs, even a minor delay in communication may have adverse consequences (e.g., a weld being placed in the wrong location). As such, coordinating communication between the PLC and the SAs through a base station (gNB) may require multiple over-the-air (OTA) transmissions and adversely impact the latency and reliability.

IoT traffic may also typically be deterministic and have smaller packet size (e.g., 32-256 bytes) compared to other communications (e.g., cellular). Thus, the overall bandwidth requirement for IoT may be low (e.g., two resource blocks might be sufficient for many communications). However, SAs may also have constraints on UE capabilities in terms of bandwidth and processing power compared to typical UEs (e.g., smart phones). This is because unlike smart phones, SAs are typically affixed to controlled devices (e.g., robotic arm in above example) and do not require the full capabilities such as user interface, enhanced memory, and processing power due to the limited utilization of the SAs. And while each packet transmitted in IoT may individually be small in size (e.g., 32-256 bytes), the overall bandwidth may be large for IoT with dedicated frequency bands because of the high number of SAs (e.g., 20-50 SAs) that may be controlled by a single controlled PLC. For at least the foregoing reasons, communications for IoT devices (e.g., between PLC and plurality of SAs) may benefit from sidelink communication as opposed to being controlled via a base station that schedules resources between the PLC and the SAs. Similarly, other applications other than IoT may also have such low latency requirements that would benefit from sidelink communication.

However, as noted above, in contrast to C-V2X, many applications for sidelink communication such as IoT have significant number of sub-channels (e.g., 50-100 for IoT). Blind decoding all the sub-channels, as is conducted in conventional sidelink communications for applications such as C-V2X, may exceed UE capabilities and adversely impact the latency and reliability constraints. Additionally, in IoT applications, SAs may not need to detect or monitor all transmissions.

Aspects of the present disclosure solve the above-identified problem by providing techniques for configuring a search space for sidelink communications between a plurality of UEs. For purposes of the present disclosure, the term "search space" may correspond to a set of control channel elements (CCEs) that constitute a control or data region in which the PSCCH that carries scheduling information for the one or more UEs may be allocated. Simply stated, a search space is a location in resource blocks where the receiver UE may search for PSCCH and/or PSSCH (e.g., data packet). The CCE indices in a given configurable control resource set (CORESET) for the PSCCH may be calculated based on a hashing function (while other hashing functions may also be utilized) such as:

$$L \cdot \left\{ \left( Y_{p,n^\mu_{s,f}} + \left\lfloor \frac{m_{s,n_{CI}} \cdot N_{CCE,p}}{L \cdot M^{(L)}_{s,\max}} \right\rfloor + n_{CI} \right) \mod \lfloor N_{CCE,p} / L \rfloor \right\} + i \quad \text{Equation 1}$$

The techniques described herein configure a search space (e.g., subset of all available sub-channels) to decode the sidelink packets (e.g., PSCCH and/or PSSCH) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications.

In some examples, a sidelink transmitting UE ("SL-Tx-UE") may transmit to a sidelink receiver UE ("SL-Rx-UE"), the PSCCH in one of the subset subchannels of the search space. Accordingly, the SL-Rx-UE receiving the transmission from the SL-Tx-UE may conduct blind decoding of the PSCCH only in the subset of subchannels associated with the search space as opposed to all the subchannels as required in conventional communications. In terms of sidelink communication, the PSCCH in the search space may also include information associated with the monitoring periodicity, offset, duration, etc. that can be configured as PSCCH search space. In some examples, the size of the search space in each monitoring occasion and/or multiple search spaces over a plurality of monitoring occasions may also be configured.

In some examples, multiple types of search spaces may be configured for sidelink communication. For example, a common search space (CSS) may be configured that is globally common to all sidelink UEs. Additionally or alternatively, a transmitter UE dependent CSS ("Tx-dependent CSS") may be configured for SL-Tx-UEs that is based on SL-Tx-UE's identification ("SL-Tx-ID"). Thus, for each SL-Tx-UE, a common search space may be configured as a search space that is common to all SL-Tx-UEs that receive communication from that particular SL-Tx-UE. Such configuration is generally ideal for broadcast communication where the SL-Tx-UE may broadcast a message to a plurality of SL-Rx-UEs.

Additionally or alternatively, for a single SL-Tx-UE, a UE-specific common search space may be configured that is common to a subset of SL-Rx-UEs, but not all SL-Rx-UEs. In such instance, the search space may be determined based on a configured seed for a hashing function (e.g., Equation 1) that maps to an index at which the control channel data (e.g., PSCCH) may be allocated for such SL-Rx-UEs. Such configuration may be ideal for multi-cast or group-cast communications.

Additionally or alternatively, the search space may be configured for each SL-Rx-UE via a UE-specific search space (USS). In such instance, the search space may be configured that is hashed based on SL-Rx-UE ID (e.g., SL-RX-ID or SL-Tx-Rx-Link ID). Such configuration may be ideal for unicast communications.

The search spaces for PSCCH sidelink communication may also be designed in a number of different ways. Indeed, in one example, the configured search spaces may occupy contiguous subchannels with different offset and length from a reference point. In another example, the search spaces may uniformly select PSCCH locations with a random seed (e.g., NR PSDCH) with a number of subchannels that are indicated. In yet another example, PSCCH location may be randomly selected with a random seed with a number of channels indicated. In each of the three examples, the maximum PSSCH allocation size may be smaller than the total number of subchannels.

Various aspects are now described in more detail with reference to the FIGS. 1-7. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 514 and a sidelink communication management component 550 (see FIG. 5) to configure a search space for sidelink communications between a plurality of UEs. Particularly, the sidelink communication management component 550 may configure and search a search space (e.g., subset of all available sub-channels) to decode the sidelink packets (e.g., physical sidelink control channel (PSCCH) and physical sidelink shared channel (PSSCH)) transmitted between a first UE and a second UE over sidelink communication without the need for the receiver UE (e.g., second UE) to perform blind decoding of all sidelink sub-channels as is currently required in conventional systems. Thus, the disclosed techniques reduce latency and maximize the resource utilization (e.g., by using less processing power and bandwidth) for sidelink communications The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
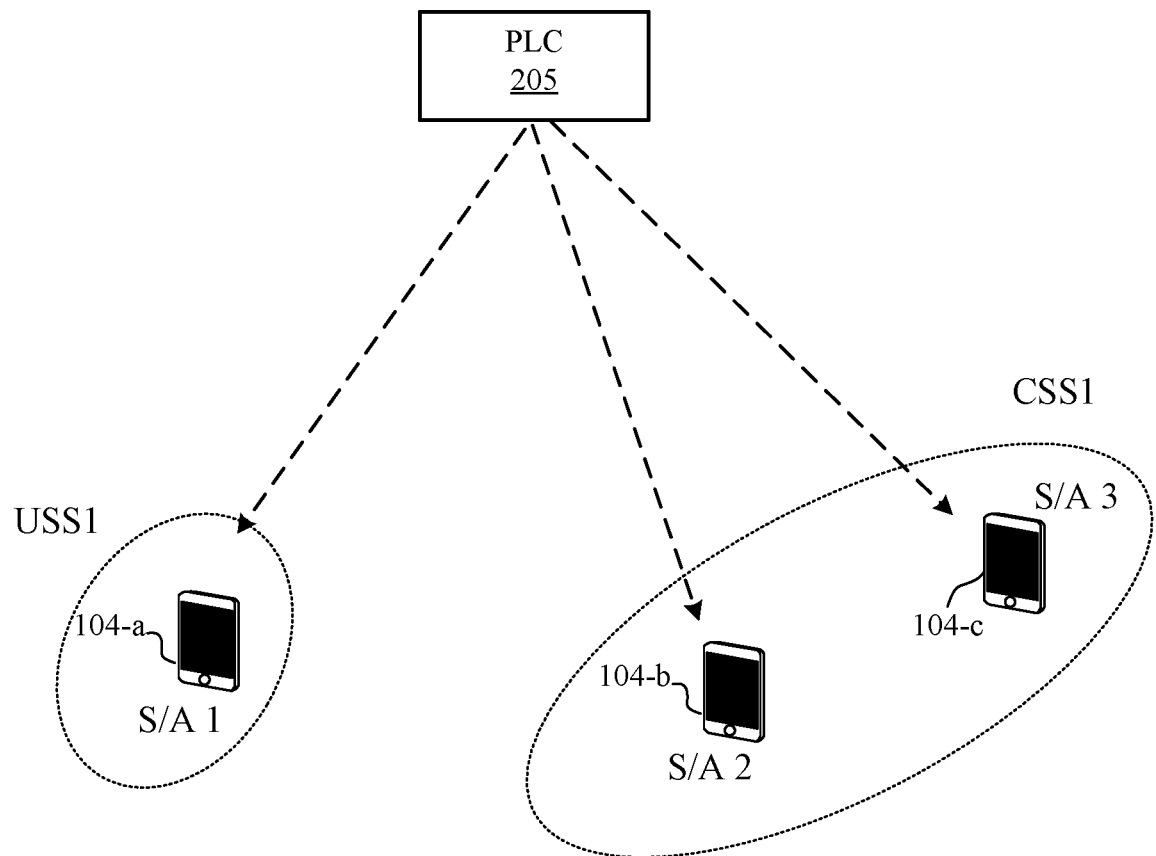
FIG. 2 is a schematic diagram of an example of a wireless communication system implementing sidelink communication in IoT applications accordance with aspects of the present disclosure.

FIG. 2 is a schematic diagram 200 of an example of a wireless communication system implementing sidelink communication in IoT applications in accordance with aspects of the present disclosure. The schematic diagram 200 illustrates an example of programmable logic controller (PLC) 205, and may include one or more UEs 104 that may be examples of sensors/actuators (SAs) discussed above. In some instances, the PLC 205 may be a gNB 102 or a UE 104 that is operating as a controller in IoT devices or other sidelink applications. When operating as a UE 104, the PLC 205 may include gNB functionalities that may include, for example, configuring search spaces and allocating resources to one or more SAs/UEs 104.

Thus, in some examples, there may be two modes of resource allocations. In first mode (Mode 1), the base station 102 may assign Tx resources for sidelink communications through downlink control information (DCI) messages. In the second mode (Mode 2), the transmitting UEs (Tx UE) may autonomously select resources for sidelink communication. Particularly, the Tx UE may perform channel sensing by blindly decoding all PSCCH channels and finding out the reserved resources by other sidelink transmissions. Tx may then report available resources to upper layer that selects resource usage for sidelink communication. In both instances, the Rx UE operation may be the same.

As noted above, in the IoT applications for instance, sidelink communications can be enabled between direct PLC 205 and a host of sensors/actuators (also referred hereto as UEs 104). In some examples, the UEs 104 operating as sensors/actuators may be reduced capability UEs 104 than traditional smart phones or may be configured with hardware specific for various applications (e.g., additional sensors etc.) A single PLC 205 may control 20-50 SAs or UEs 104 (e.g., first UE 104-a, second UE 104-b, and third UE 104-c). Because of the implementation of IoT applications, there may be tight latency (e.g., 1-2 milliseconds) and ultra-reliability requirements (e.g., $10^{-6}$ error rate) for communications between the PLC 204 and the plurality of SAs/UEs 104.

In some aspects, IoT traffic may be smaller packet size (e.g., 32-256 bytes) compared to other communications (e.g., cellular). Thus, the overall bandwidth requirement for IoT may be low (e.g., two resource blocks might be sufficient for many communications). Additionally, applications for sidelink communication in IoT application may have significant number of sub-channels (e.g., 50-100) in comparison to, for example, C-V2X applications. Thus, blind decoding all the sub-channels, as is conducted in conventional sidelink communications for applications such as C-V2X, may exceed UE capabilities and adversely impact the latency and reliability constraints.

To this end, aspects of the present disclosure may configure a search space for sidelink communications between a plurality of UEs 104. For purposes of the present disclosure, it should be appreciated that UE 104 may broadly encompass both the PLC 205 and the SAs that may be reduced or specially configured capability UEs 104 (e.g., configured with specific hardware such as sensors and actuators). Thus, the techniques described herein configure a search space (e.g., subset of all available sub-channels) to decode the sidelink packets (e.g., PSCCH) transmitted between a first UE 104 (that may be PLC 205 for example) and a second UE (that may be SA1/UE 104-a) over sidelink communication without the need for the receiver UE 104 (e.g., SA1/UE 104-a, b, c) to perform blind decoding of all sidelink sub-channels as is currently required in conventional systems.

In some examples, the search spaces may be configured for sidelink communication that are either UE-specific search space (USS) (e.g., for UE 104-*a*) or that are common search space (CSS) may be configured that are globally common to a plurality of sidelink UEs (e.g., UEs 104-*b* and *c*). Additionally or alternatively, the search spaces may also be configured that are transmitter UE dependent CSS ("Tx-dependent CSS") based on SL-Tx-UE-ID.

Figure 3:
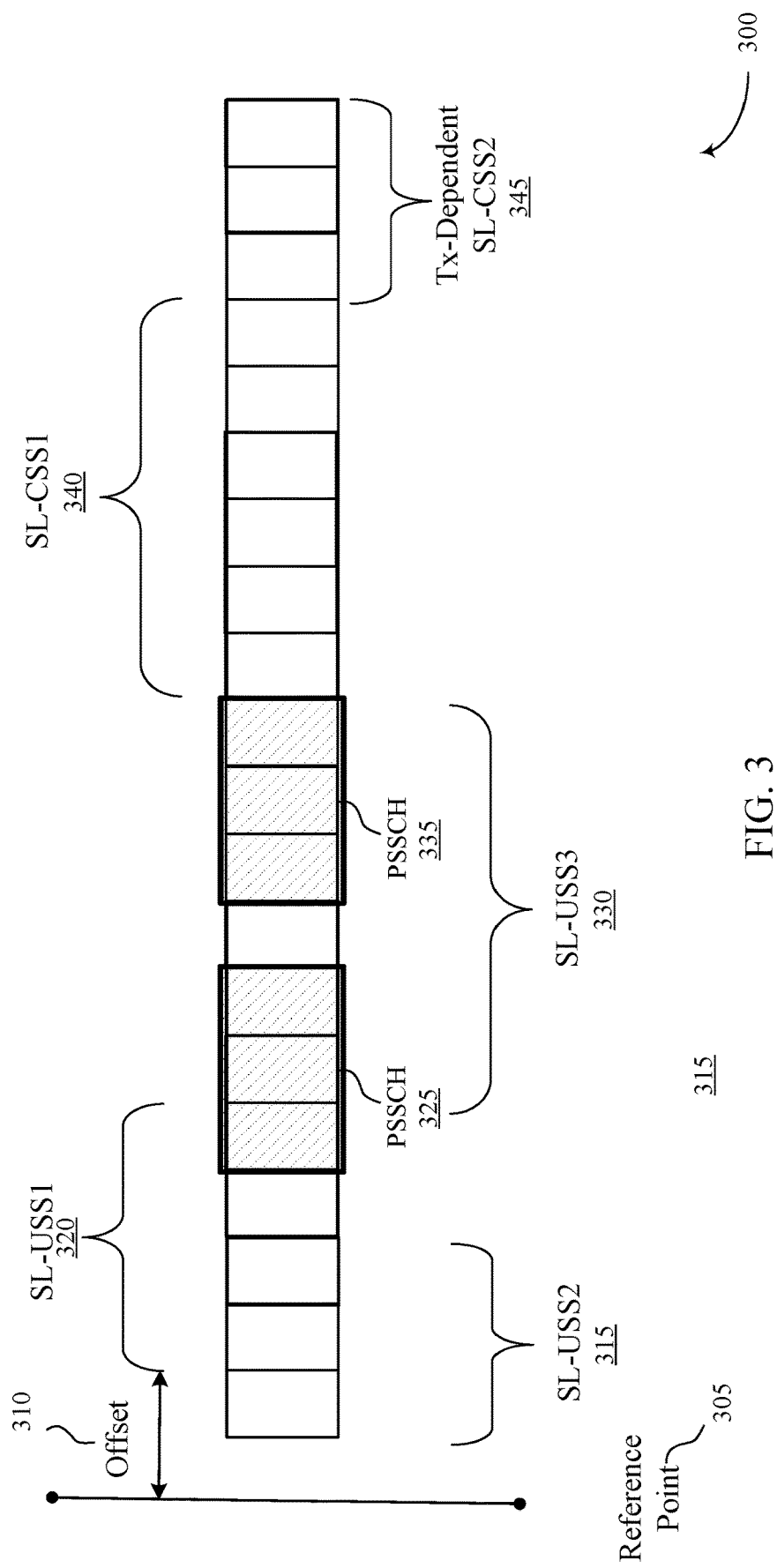
FIG. 3 is a schematic diagram of an example a first search space design for sidelink communication where contiguous subchannels may be allocated as search spaces in accordance with various aspects of the present disclosure.

FIG. 3 is a schematic diagram 300 of a search space for sidelink communication where contiguous subchannels (e.g., first search space 320 for SL-USS1, second search space 330 for SL-USS3, third search space 340 for SL-CSS1, and fourth search space 345 for SL-CSS2 that is Tx-dependent) may be configured for one or more UEs 104. The configured search spaces for PSCCH indexes may be contiguous. Additionally, the UEs 104 may circumvent some blind decoding of subchannels once the frequency domain resource assignment (FDRA) is decoded for a lower index subchannel.

Thus, as illustrated, a first search space 320 that is subset of all available subchannels may be configured as UE-specific search space for the first UE 104-*a*. The PSCCH index (e.g., a location in resource blocks where the receiver UE may search for PSCCH and/or PSSCH) may be calculated based on the offset value 310 from a reference point 305. In some examples, the CSS offset may be derived from SS-ID and the USS offset may be a hash function that is dependent on slot number or SL-ID.

In some aspects, the PSSCH 335 (e.g., data associated with the sidelink packet) may be included within the search space as PSSCH 335 that is within the search space of SL-USS3 330. However, in other examples, the PSSCH 325 may use resources of other search spaces as PSSCH 325 that occupies part of the USS resources for first UE 104-*a* in SL-USS1 320 and second UE 104-*c* in SL-USS3 330.

In scenarios where the PSSCH 325 may use resources of other search spaces, the sidelink UEs 104 may perform resource collision procedures. However, when the resources are being allocated by the base station 102, such resource collision procedures may not be required as the base station may control all resource allocations. In certain scenarios, the search spaces may also have overlapping indexes when the base station 102 controls resources. In some instances, frequency diversity may also be achieved when assigning multiple search spaces in order to mitigate resource collision.

Figure 4A:
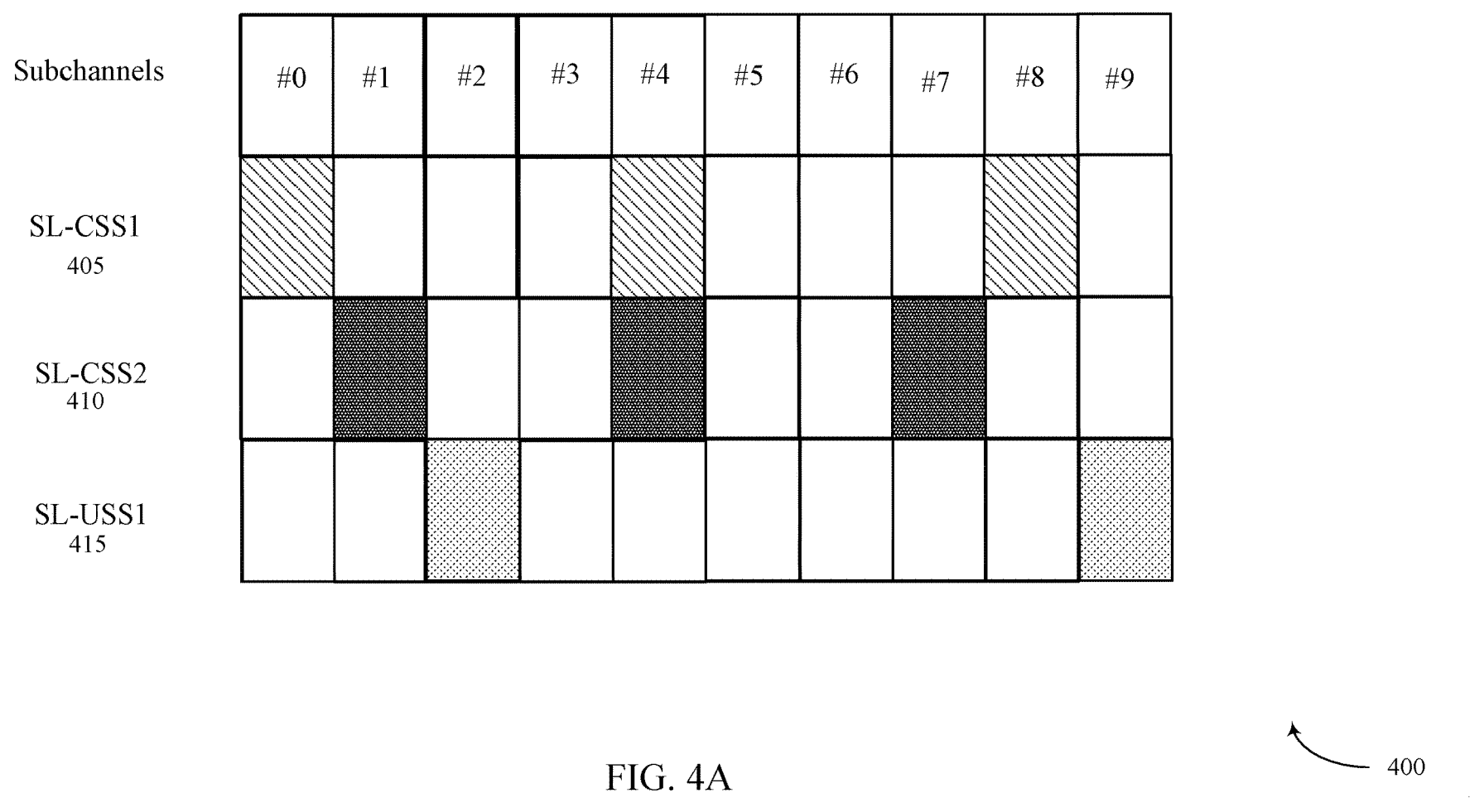

FIG. 4A is a schematic diagram 400 of an example non-contiguous (but uniformly selected) indexes for the search space allocation. In such scenario, either base station 102 (in first mode where the base station 102 controls resources for sidelink communication between two UEs and thus the base station 102 may assign Tx resources for sidelink communication) or UE 104 (in second mode where the UE 104 autonomously selects resources for sidelink communication) may uniformly select PSCCH locations within the subchannels with random seed for the hashing function (see Equation 1 above) by identifying a number of subchannels that are allocated.

In some aspects, the search space may have arbitrary indexes and define the PSCCH positions within resource blocks that the UE 104 may monitor. To implement different search space designs, the PSCCH indexes to be monitored by the UE may be determined based on the following equation that leverages the PDCCH has design (as shown in Equation 1):

$$\left( Y_{p,n_{s,f}^\mu} + \left\lfloor \frac{m_{p,s} N_{subchannel}}{M_{p,max}} \right\rfloor \right) \mod N_{subchannel} \quad \text{Equation 2}$$

In some instances, one or more parameters for the hashing function may be based on the SL-ID for allocation of search space subchannels. In such instances, the SL-ID may be SL-Tx-ID for Tx-Dependent CSS. But for SL-USS, the SL-ID may be SL-Rx-ID where the collision probability may be higher if multiple sidelink transmissions may be targeting the same receiver UE. In other instances, for SL-USS, the SL-ID may be based on SL-Tx-ID-Link-ID in order to minimize potential collision of resources during the sidelink communication. Thus, where the base station may only have information regarding the transmitter UE (Tx), the base station 102 may allocate search space subchannels for SL-CSS (see 405 and 410) or Tx-dependent CSS. However, in other instances (e.g., Mode 2 communication discussed above where the Tx UE 104 may autonomously select resources), the Tx and Rx UE may jointly select an SL-ID such that the Rx UE 104 is decoding the intended resources based on the same hashing function and values used by Tx UE 104. As such, in this instance, the allocation of the search space may be UE-specific search space (see 415).

FIG. 4B is a schematic diagram 450 of an example random search space allocation. Specifically, in some examples, the UEs 104 may be configured (or pre-configured) with the same random number generator ($RNG_{seed,\ length}$), where the seed value may determine the random selection and the length parameter value may select different number of PSCCH positions.

In some examples, with respect to SL-USS and Tx-dependent CSS, the SL-ID may be used as the seed value to randomly select PSCCH positions for monitoring. In such instances, SL-Tx-ID or SL-Rx-ID may be used and a common seed for search space can also be exchanged between the Tx-UE 104 and Rx-UE 104 during discovery mode. For SL-CSS, a pre-configured and/or common seeds may be distributed to all SL-UEs for generating the SL-CSSs. Thus, in first mode (Mode 1), the base station 102 is informed the seeds by the SL-Tx UE 104. In the second mode (Mode 2), the seeds may be pre-configured and/or exchanged between the Tx-UE 104 and Rx-UE 104. The schematic diagram 450 of resource allocation illustrates examples of search space subchannels for PSCCH that may be allocated for CSS and USS based on random number generation.

Figure 5:
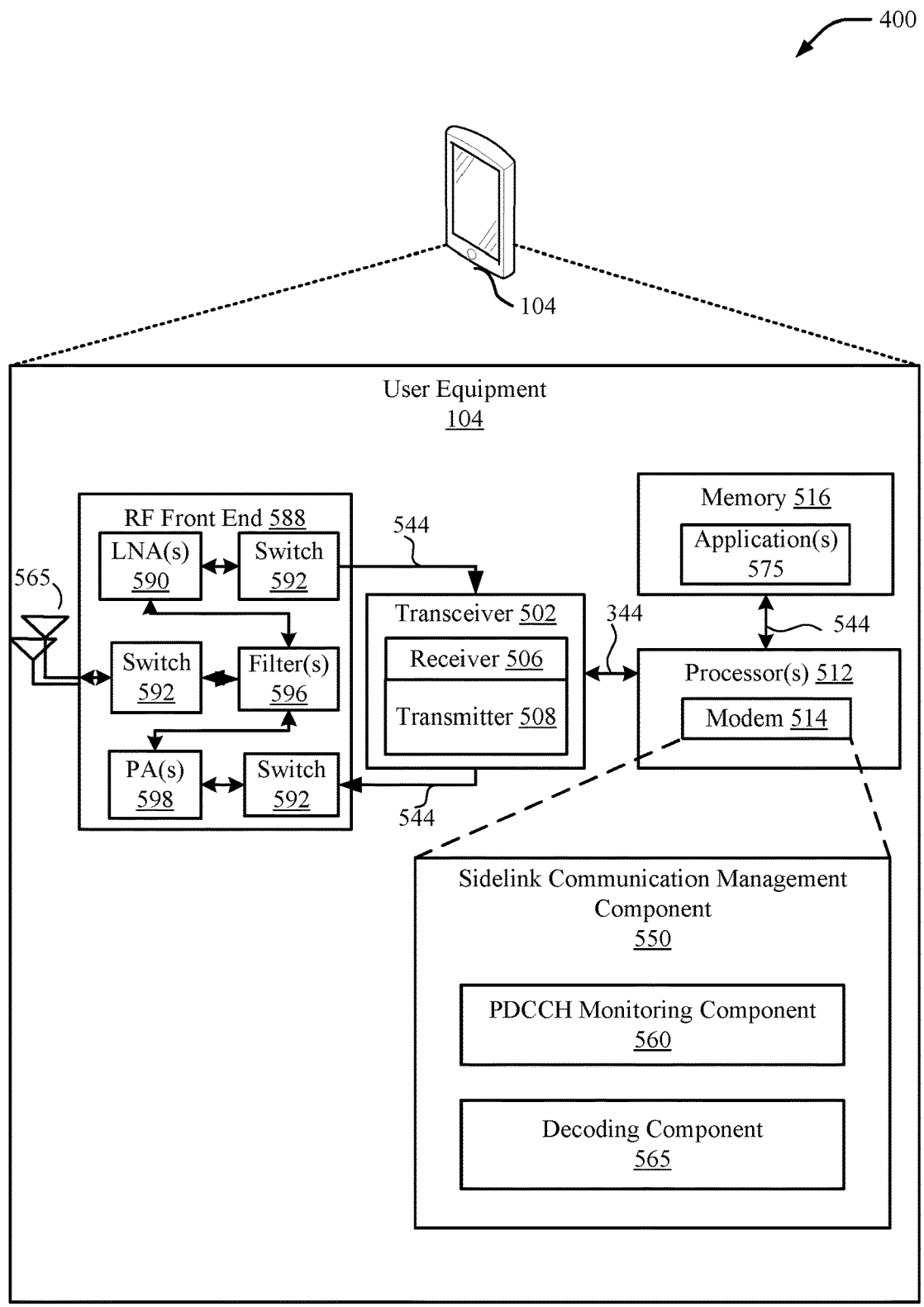
FIG. 5 is a schematic diagram of an example implementation of various components of a user equipment in accordance with various aspects of the present disclosure.

FIG. 5 illustrates a hardware components and subcomponents of a device that may be a UE 104 for implementing one or more methods (e.g., method 600) described herein in accordance with various aspects of the present disclosure. For example, one example of an implementation of the UE 104 may include a variety of components, some of which have already been described above, but including components such as one or more processors 512, memory 516 and transceiver 502 in communication via one or more buses 544, which may operate in conjunction with the sidelink communication management component 550 to perform functions described herein related to including one or more methods (e.g., 600) of the present disclosure.

In some aspects, the sidelink communication management component 550 may configure and monitor a search space for sidelink communications between a plurality of UEs. Particularly, the sidelink communication management component 550 configures a search space (e.g., subset of all available sub-channels) to decode the sidelink packets (e.g., physical sidelink control channel (PSCCH) and physical sidelink shared channel (PSSCH)) transmitted between a first UE and a second UE over sidelink communication without the need for the receiver UE (e.g., second UE) to perform blind decoding of all sidelink sub-channels as is currently required in conventional systems. The sidelink communication management component 550 may further include PDCCH monitoring component 560 that monitors the search spaces and communications from other UEs 104 and base station 102 and the decoding component 565 to perform blind decoding only in the sub-channels identified in the search space.

The one or more processors 512, modem 514, memory 516, transceiver 502, RF front end 388 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to sidelink communication management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with sidelink communication management component 550 may be performed by transceiver 502.

The memory 516 may be configured to store data used herein and/or local versions of application(s) 575 or sidelink communication management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining sidelink communication management component 550 and/or one or more of its subcomponents, and/or data associated therewith, when the UE 104 is operating at least one processor 512 to execute sidelink communication management component 350 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 390 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device can communicate with, for example, one or more base stations 102 or one or more cells associated with one or more base stations 102 or other UEs 104. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on UE configuration information associated with transmitting device as provided by the network during cell selection and/or cell reselection.

Figure 6A:
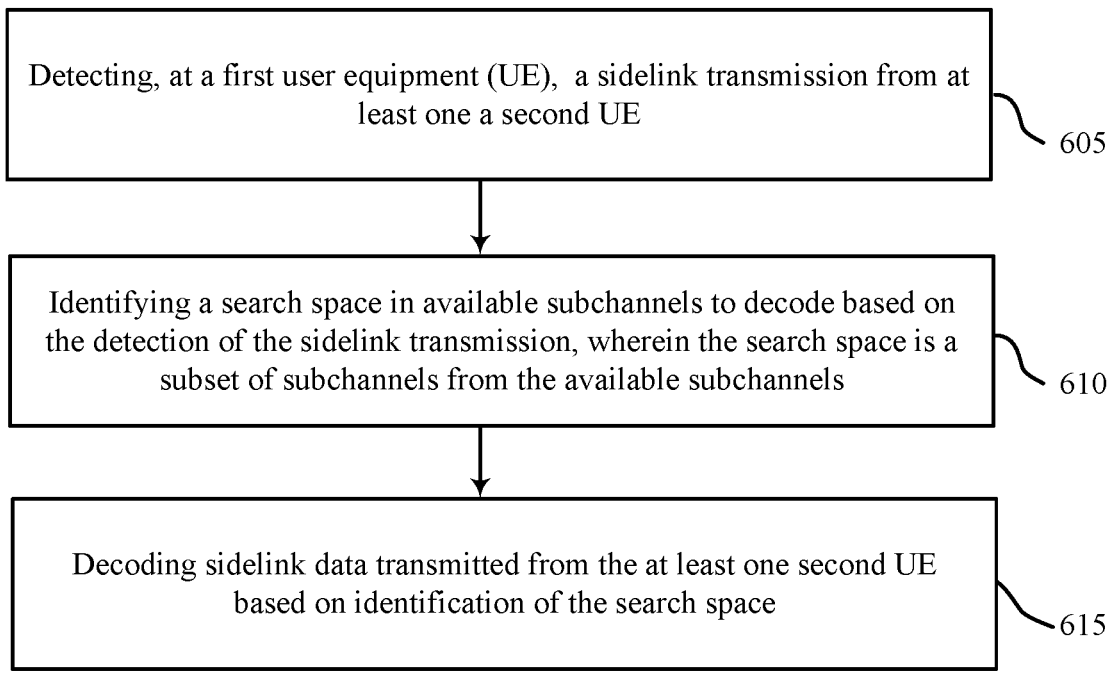
FIG. 6A is a flow diagram of an example of a method of wireless communication implemented by the UE (e.g., S/As) in accordance with aspects of the present disclosure.

Referring to FIG. 6A, an example method 600 for wireless communications in accordance with aspects of the present disclosure may be performed by one or more UEs 104 (e.g., S/As) discussed with reference to FIGS. 1, 2 and 5. Although the method 600 is described below with respect to the elements of the UE 104, other components may be used to implement one or more of the steps described herein.

At block 605, the method 600 may include detecting, at a first UE, a sidelink transmission from at least one second UE. Aspects of block 605 may be performed by the transceiver 502 that receives signals detected on one or more antennas 565 as described with reference to FIG. 5. The detected signals are filtered through the RF front end 588 of the UE 104 and forwarded to the modem 514 to be processed by sidelink communication management component 550. Thus, one or more antennas 565, transceiver 502, sidelink communication management component 550, modem 514, processor 512, and/or the UE 104 or one of its subcomponents may define the means for detecting, at a first UE, a sidelink transmission from a second UE.

At block 610, the method 600 may include identifying a search space in available subchannels to decode based on the detection of the sidelink transmission, wherein the search space is a subset of subchannels from the available subchannels. In some examples, the search space may be one or more of a common search space (CSS) that is globally common for a plurality of sidelink UEs, a transmitter UE dependent CSS ("Tx-dependent CSS") that is configured based on the second UE's transmitter identification ("SL-Tx-ID"), or a UE-specific search space (USS) configured for the first UE. In other examples, the search may be sidelink configured CSS ("SL-configured CSS") that is transmitted by a transmitting UE ("Tx-UE") to a subset of UEs. In such example, the SL-configured CSS may be configured based on a seed selected by the Tx-UE. In some aspects, the USS may be hashed based on the first UE's receiver identification ("SL-Rx-UE ID") or a link identification between the first UE and the second UE ("SL-Tx-Rx-Link ID").

In some aspects, identifying the search space in the available subchannels, may comprise determining a PSCCH index that the first UE monitors, wherein the PSCCH index is determined based on a hashing function calculated using a SL-ID (e.g., where the search space is allocated non-contiguous subchannels). In such instance, the SL-ID may be one of the second UE's transmitter identification ("SL-Tx-ID"), the first UE's receiver identification ("SL-Rx-UE ID") or a link identification between the first UE and the second UE ("SL-Tx-Rx-Link ID").

In some aspects, identifying the search space may include determining a PSCCH index that the first UE monitors. The PSCCH index may be determined based on a hashing function calculated using a random number generator. The random number generator may include a seed and length value of PSCCH that is exchanged between the first UE and the second UE. As such, the first UE may utilize the seed and the length value for the hashing function to calculate the PSCCH index in order to identify the search space Aspects of block 610 may be performed by the sidelink communication management component 550 described with reference to FIG. 5, and more particularly the PDCCH monitoring component 560 by searching for configured search spaces for PSCCH indexes that may be calculated based on hashing functions (e.g., equation 1 and 2 discussed above) or via configuration information received from the base station 102 or Tx UE 104. Thus, the sidelink communication management component 550, PDCCH monitoring component 560, modem 514, processor 512, and/or the UE 104 or one of its subcomponents may define the means for identifying a search space in available subchannels to decode based on the detection of the sidelink transmission.

At block 615, the method 600 may include decoding sidelink data transmitted from the at least one second UE based on identification of the search space. In some aspects, the search space may be allocated contiguous subchannels determined based on an offset of a reference point. In one scenario, decoding the search space for at least the portion of the data packet transmitted from the second UE may comprise decoding a PSSCH that is entirely within the search space allocated to the first UE. In other words, the PSSCH may be entirely located within a single search space (either USS or CSS). In another scenario, decoding the search space for at least the portion of the data packet transmitted from the second UE may comprise decoding a first portion of a PSSCH that is located within the search space allocated to the first UE, and decoding a second portion of the PSSCH that is located within a second space allocated to one or more UEs excluding the first UE (e.g., the second portion of PSSCH may be allocated to a plurality of UEs other than the first UE). Stated differently, the PSSCH in such a scenario may use resources of other search spaces that may be allocated to other UEs or another CSS. Aspects of block 615 may be performed by the sidelink communication management component 550, and more particularly the decoding component 565 described with reference to FIG. 5. Thus, the sidelink communication management component 550, the decoding component 565, modem 514, processor 512, and/or the UE 104 or one of its subcomponents may define the means for decoding the search space for at least a portion of a data packet transmitted from the second UE.

Figure 6B:
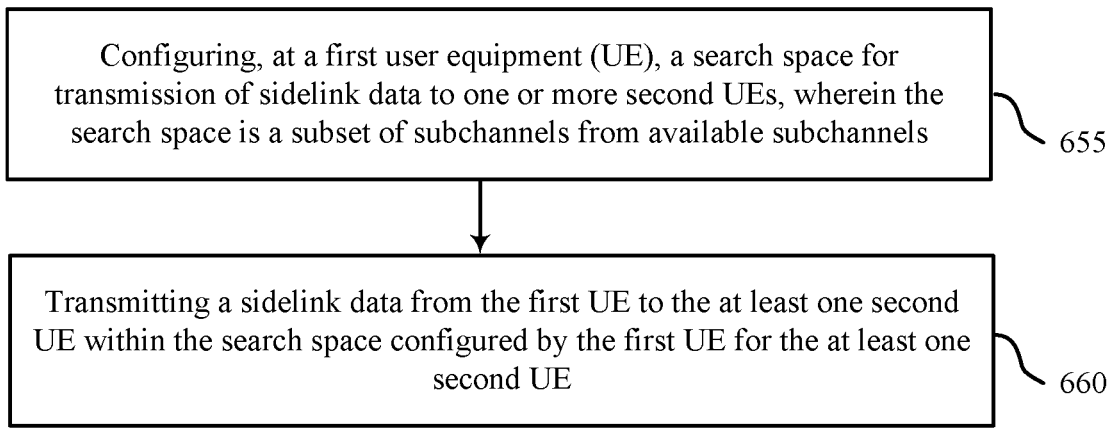
FIG. 6B is a flow diagram of an example of a method of wireless communication implemented by the UE (e.g., PLC) in accordance with aspects of the present disclosure.

Referring to FIG. 6B, an example method 650 for wireless communications in accordance with aspects of the present disclosure may also be performed by one or more UEs 104 (e.g., PLC) discussed with reference to FIGS. 1, 2 and 5. Although the method 650 is described below with respect to the elements of the UE 104, other components may be used to implement one or more of the steps described herein.

At block 655, the method 650 may include configuring, at a first UE, a search space for transmission of sidelink data to one or more second UEs, wherein the search space is a subset of subchannels from available subchannels. Aspects of block 655 may be performed by the sidelink communication management component 550 as described with reference to FIG. 5. Thus, the sidelink communication management component 550, modem 514, processor 512, and/or the UE 104 or one of its subcomponents may define the means for configuring, at a first UE, a search space for transmission of sidelink data to one or more second UEs.

In some examples, the search space may include a common search space (CSS) that is globally common for a plurality of sidelink UEs, a transmitter UE dependent CSS ("Tx-dependent CSS") that is configured based on the first UE's transmitter identification ("SL-Tx-ID"), sidelink configured CSS ("SL-configured CSS") that is transmitted by a transmitting UE ("Tx-UE") to a subset of UEs, wherein the SL-configured CSS is configured based on a seed selected by the Tx-UE, or a UE-specific search space (USS) configured for the at least one second UE, wherein the USS is hashed based on the at least one second UE's receiver identification ("SL-Rx-UE ID") or a link identification between the first UE and the second UE ("SL-Tx-Rx-Link ID").

The search space may be allocated to contiguous subchannels determined based on an offset of a reference point.

In some aspects, configuring the search space may include determining a physical sidelink control channel (PSCCH) index that the at least one second UE should monitor, wherein the PSCCH index may be determined based on a hashing function calculated using a sidelink identification (SL-ID). In such examples, the SL-ID may be one of the first UE's transmitter identification ("SL-Tx-ID"), the at least one second UE's receiver identification ("SL-Rx-UE ID") or a link identification between the first UE and the at least one second UE ("SL-Tx-Rx-Link ID").

In other examples, configuring the search space may include determining a physical sidelink control channel (PSCCH) index that the at least one second UE should monitor, wherein the PSCCH index is determined based on a hashing function calculated using a random number generator. In such scenarios, the random number generator may include a seed and length value of PSCCH that is exchanged between the first UE and the at least one second UE, and where the first UE may utilize the seed and the length value for the hashing function to calculate the PSCCH index in order to identify the search space.

At block 660, the method 650 may include transmitting a sidelink data from the first UE to the at least one second UE within the search space configured by the first UE for the at least one second UE. Aspects of block 660 may be performed by the transceiver 502 that transmits signals received from sidelink communication management component 550 to another UE via on one or more antennas 565 as described with reference to FIG. 5. Thus, one or more antennas 565, transceiver 502, sidelink communication management component 550, modem 514, processor 512, and/or the UE 104 or one of its subcomponents may define the means for transmitting a sidelink data from the first UE to the at least one second UE within the search space configured by the first UE for the at least one second UE.

Figure 7:
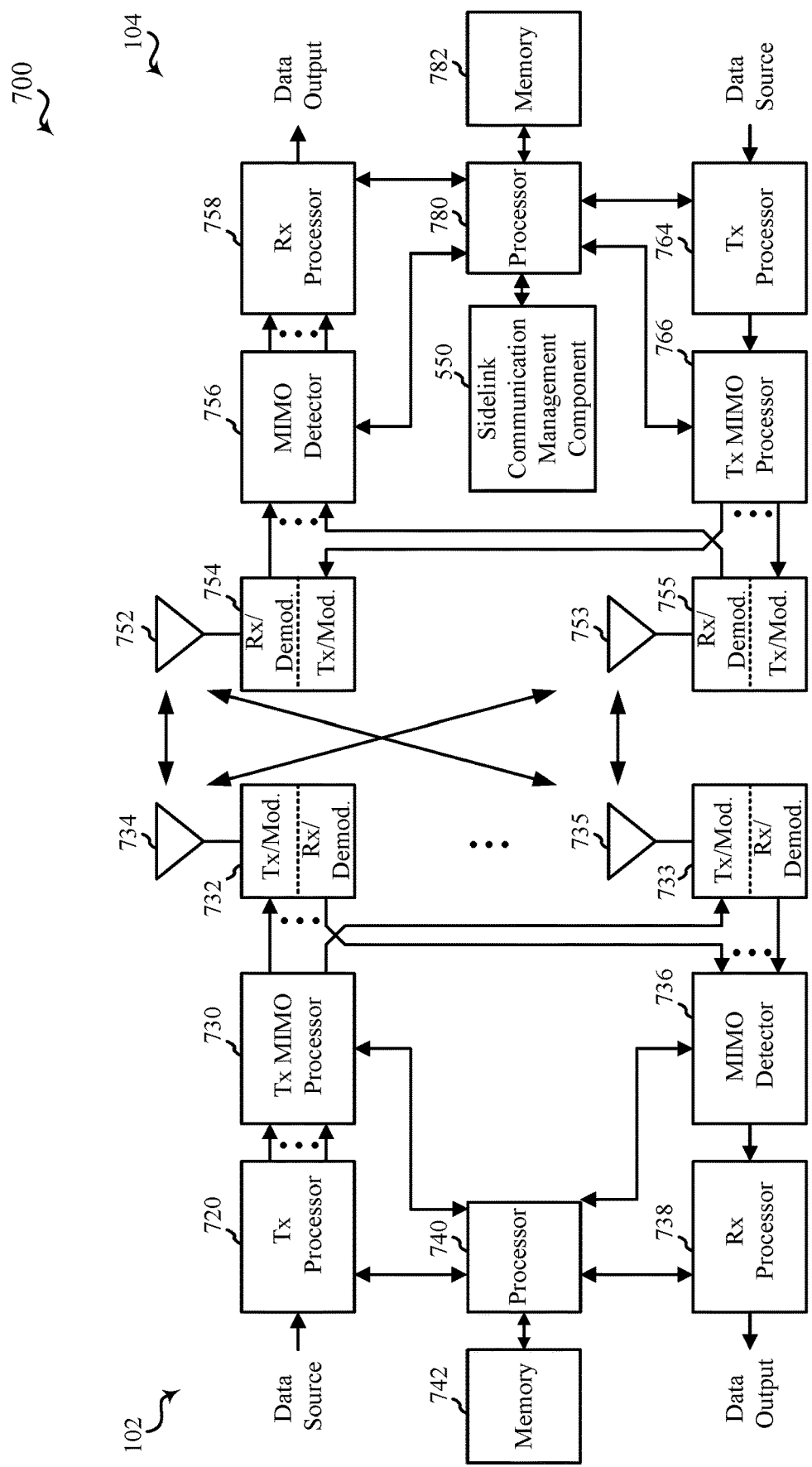
FIG. 7 is a block diagram of a MIMO communication system including a base station and a UE.

In some examples, transmitting the sidelink data from the first UE to the at least one second UE within the search space may include transmitting a physical sidelink shared channel (PSSCH) that is entirely within the search space allocated to the at least one second UE. Transmitting the sidelink data from the first UE to the at least one second UE within the search space may also include transmitting a first portion of a physical sidelink shared channel (PSSCH) that is located within the search space allocated to the at least one second UE, and transmitting a second portion of the PSSCH that is located within the second space allocated to one or more UEs excluding the at least one second UE FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a sidelink communication management component 550 (see e.g., FIGS. 1 and 5).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

Some Further Example Clauses

Implementation examples are described in the following numbered clauses:
1. A method for wireless communications, comprising:
    detecting, at a first user equipment (UE), a sidelink transmission from at least one second UE;
    identifying a search space in available subchannels to decode based on the detection of the sidelink transmission, wherein the search space is a subset of subchannels from the available subchannels; and
    decoding sidelink data transmitted from the at least one second UE based on identification of the search space.
2. The method of clause 1, wherein the search space is one or more of:
    a common search space (CSS) that is globally common for a plurality of sidelink UEs,
    a transmitter UE dependent CSS ("Tx-dependent CSS") that is configured based on the at least one second UE's transmitter identification ("SL-Tx-ID"),
    sidelink configured CSS ("SL-configured CSS") that is transmitted by a transmitting UE ("Tx-UE") to a subset of UEs, wherein the SL-configured CSS is configured based on a seed selected by the Tx-UE, or
    a UE-specific search space (USS) configured for the first UE, wherein the USS is hashed based on the first UE's receiver identification ("SL-Rx-UE ID") or a link identification between the first UE and the second UE ("SL-Tx-Rx-Link ID").
3. The method of clause 1 or 2, wherein the search space is allocated contiguous subchannels determined based on an offset of a reference point.
4. The method of any preceding clause, wherein decoding the sidelink data transmitted from the at least one second UE based on identification of the search space, comprises:
    decoding a physical sidelink shared channel (PSSCH) that is entirely within the search space allocated to the first UE.
5. The method of any preceding clause, wherein decoding the sidelink data transmitted from the at least one second UE based on identification of the search space, comprises:
    decoding a first portion of a physical sidelink shared channel (PSSCH) that is located within the search space allocated to the first UE; and
    decoding a second portion of the PSSCH that is located within the second space allocated to one or more UEs excluding the first UE.
6. The method of any preceding clause, wherein identifying the search space in the available subchannels, comprises:
    determining a physical sidelink control channel (PSCCH) index that the first UE monitors, wherein the PSCCH index is determined based on a hashing function calculated using a sidelink identification (SL-ID).
7. The method of any preceding clause, wherein the SL-ID is one of the second UE's transmitter identification ("SL-Tx-ID"), the first UE's receiver identification ("SL-Rx-UE ID") or a link identification between the first UE and the second UE ("SL-Tx-Rx-Link ID").
8. The method of any preceding clause, wherein identifying the search space in the available subchannels, comprises:
    determining a physical sidelink control channel (PSCCH) index that the first UE monitors, wherein the PSCCH index is determined based on a hashing function calculated using a random number generator.
9. The method of any preceding clause, wherein the random number generator includes a seed and length value of PSCCH that is exchanged between the first UE and the second UE, and
    wherein the first UE utilizes the seed and the length value for the hashing function to calculate the PSCCH index in order to identify the search space.
10. An apparatus for wireless communications, comprising:
    at least one processor;
    and memory coupled to the at least one processor, the memory including instructions executable by the at least one processor to cause the apparatus to:
        detect, at a first user equipment (UE), a sidelink transmission from at least one second UE;
        identify a search space in available subchannels to decode based on the detection of the sidelink transmission, wherein the search space is a subset of subchannels from the available subchannels; and
        decode sidelink data transmitted from the at least one second UE based on identification of the search space.
11. The apparatus of clause 10, wherein the search space is one or more of:
    a common search space (CSS) that is globally common for a plurality of sidelink UEs,
    a transmitter UE dependent CSS ("Tx-dependent CSS") that is configured based on the at least one second UE's transmitter identification ("SL-Tx-ID"),
    sidelink configured CSS ("SL-configured CSS") that is transmitted by a transmitting UE ("Tx-UE") to a subset of UEs, wherein the SL-configured CSS is configured based on a seed selected by the Tx-UE, or
    a UE-specific search space (USS) configured for the first UE, wherein the USS is hashed based on the first UE's receiver identification ("SL-Rx-UE ID") or a link identification between the first UE and the second UE ("SL-Tx-Rx-Link ID").
12. The apparatus of clause 10 or 11, wherein the search space is allocated contiguous subchannels determined based on an offset of a reference point.
13. The apparatus of any of preceding clauses 10-12, wherein the instructions executable by the at least one processor to cause the apparatus to decode the sidelink data transmitted from the at least one second UE based on identification of the search space, are further executable by the at least one processor to cause the apparatus to:
    decode a physical sidelink shared channel (PSSCH) that is entirely within the search space allocated to the first UE.
14. The apparatus of any of preceding clauses, wherein the instructions executable by the at least one processor to cause the apparatus to decode the sidelink data transmitted from the at least one second UE based on identification of the search space, are further executable by the at least one processor to cause the apparatus to:
    decode a first portion of a physical sidelink shared channel (PSSCH) that is located within the search space allocated to the first UE; and
    decode a second portion of the PSSCH that is located within the second space allocated to one or more UEs excluding the first UE.
15. The apparatus of any of preceding clauses, wherein the instructions executable by the at least one processor to cause the apparatus to identify the search space in the available subchannels are further executable by the at least one processor to cause the apparatus to:

determine a physical sidelink control channel (PSCCH) index that the first UE monitors, wherein the PSCCH index is determined based on a hashing function calculated using a sidelink identification (SL-ID).

16. The apparatus of any of preceding clauses, wherein the SL-ID is one of the second UE's transmitter identification ("SL-Tx-ID"), the first UE's receiver identification ("SL-Rx-UE ID") or a link identification between the first UE and the second UE ("SL-Tx-Rx-Link ID").

17. The apparatus of any of preceding clauses, wherein the instructions executable by the at least one processor to cause the apparatus to identify the search space in the available subchannels are further executable by the at least one processor to cause the apparatus to:
    determine a physical sidelink control channel (PSCCH) index that the first UE monitors, wherein the PSCCH index is determined based on a hashing function calculated using a random number generator.

18. The apparatus of any of preceding clauses, wherein the random number generator includes a seed and length value of PSCCH that is exchanged between the first UE and the second UE, and
    wherein the first UE utilizes the seed and the length value for the hashing function to calculate the PSCCH index in order to identify the search space.

19. A non-transitory computer readable medium storing instructions, executable by a processor, for wireless communications, comprising instructions for:
    detecting, at a first user equipment (UE), a sidelink transmission from at least one second UE;
    identifying a search space in available subchannels to decode based on the detection of the sidelink transmission, wherein the search space is a subset of subchannels from the available subchannels; and
    decoding sidelink data transmitted from the at least one second UE based on identification of the search space.

20. The non-transitory computer readable medium of clause 19, wherein the search space is one or more of:
    a common search space (CSS) that is globally common for a plurality of sidelink UEs,
    a transmitter UE dependent CSS ("Tx-dependent CSS") that is configured based on the at least one second UE's transmitter identification ("SL-Tx-ID"),
    sidelink configured CSS ("SL-configured CSS") that is transmitted by a transmitting UE ("Tx-UE") to a subset of UEs, wherein the SL-configured CSS is configured based on a seed selected by the Tx-UE, or
    a UE-specific search space (USS) configured for the first UE, wherein the USS is hashed based on the first UE's receiver identification ("SL-Rx-UE ID") or a link identification between the first UE and the second UE ("SL-Tx-Rx-Link ID").

21. The non-transitory computer readable medium of clause 19 or 20, wherein the search space is allocated contiguous subchannels determined based on an offset of a reference point.

22. The non-transitory computer readable medium of any preceding clause, wherein the instructions for decoding the sidelink data transmitted from the at least one second UE based on identification of the search space are further executable by a processor for:
    decoding a physical sidelink shared channel (PSSCH) that is entirely within the search space allocated to the first UE.

23. The non-transitory computer readable medium of any preceding clause, wherein the instructions for decoding the sidelink data transmitted from the at least one second UE based on identification of the search space are further executable by a processor for:
    decoding a first portion of a physical sidelink shared channel (PSSCH) that is located within the search space allocated to the first UE; and
    decoding a second portion of the PSSCH that is located within the second space allocated to one or more UEs excluding the first UE.

24. The non-transitory computer readable medium of any preceding clause, wherein the instructions for identifying the search space in the available subchannels are further executable by a processor for:
    determining a physical sidelink control channel (PSCCH) index that the first UE monitors, wherein the PSCCH index is determined based on a hashing function calculated using a sidelink identification (SL-ID).

25. The non-transitory computer readable medium of any preceding clause, wherein the SL-ID is one of the second UE's transmitter identification ("SL-Tx-ID"), the first UE's receiver identification ("SL-Rx-UE ID") or a link identification between the first UE and the second UE ("SL-Tx-Rx-Link ID").

26. The non-transitory computer readable medium of any preceding clause, wherein the instructions for identifying the search space in the available subchannels are further executable by a processor for:
    determining a physical sidelink control channel (PSCCH) index that the first UE monitors, wherein the PSCCH index is determined based on a hashing function calculated using a random number generator.

27. The non-transitory computer readable medium of any preceding clause, wherein the random number generator includes a seed and length value of PSCCH that is exchanged between the first UE and the second UE, and
    wherein the first UE utilizes the seed and the length value for the hashing function to calculate the PSCCH index in order to identify the search space.

28. An apparatus for wireless communications, comprising:
    means for detecting, at a first user equipment (UE), a sidelink transmission from at least one second UE;
    means for identifying a search space in available subchannels to decode based on the detection of the sidelink transmission, wherein the search space is a subset of subchannels from the available subchannels; and
    means for decoding sidelink data transmitted from the at least one second UE based on identification of the search space.

29. The apparatus of clause 28, wherein the search space is one or more of:
    a common search space (CSS) that is globally common for a plurality of sidelink UEs,
    a transmitter UE dependent CSS ("Tx-dependent CSS") that is configured based on the at least one second UE's transmitter identification ("SL-Tx-ID"),
    sidelink configured CSS ("SL-configured CSS") that is transmitted by a transmitting UE ("Tx-UE") to a subset of UEs, wherein the SL-configured CSS is configured based on a seed selected by the Tx-UE, or
    a UE-specific search space (USS) configured for the first UE, wherein the USS is hashed based on the first UE's receiver identification ("SL-Rx-UE ID") or a link identification between the first UE and the second UE ("SL-Tx-Rx-Link ID").

30. The apparatus of clause 28 or 29, wherein the search space is allocated contiguous subchannels determined based on an offset of a reference point.

31 A method for wireless communications, comprising:
   configuring, at a first user equipment (UE), a search space for transmission of sidelink data to one or more second UEs, wherein the search space is a subset of subchannels from available subchannels; and
   transmitting a sidelink data from the first UE to the at least one second UE within the search space configured by the first UE for the at least one second UE.
32. The method of clause 31, wherein the search space is one or more of:
   a common search space (CSS) that is globally common for a plurality of sidelink UEs,
   a transmitter UE dependent CSS ("Tx-dependent CSS") that is configured based on the first UE's transmitter identification ("SL-Tx-ID"),
   sidelink configured CSS ("SL-configured CSS") that is transmitted by a transmitting UE ("Tx-UE") to a subset of UEs, wherein the SL-configured CSS is configured based on a seed selected by the Tx-UE, or
   a UE-specific search space (USS) configured for the at least one second UE, wherein the USS is hashed based on the at least one second UE's receiver identification ("SL-Rx-UE ID") or a link identification between the first UE and the second UE ("SL-Tx-Rx-Link ID").
33. The method of clause 31 or 32, wherein the search space is allocated contiguous subchannels determined based on an offset of a reference point.
34. The method of any of preceding clauses, wherein transmitting the sidelink data from the first UE to the at least one second UE within the search space, comprises:
   transmitting a physical sidelink shared channel (PSSCH) that is entirely within the search space allocated to the at least one second UE.
35. The method of any of preceding clauses, wherein transmitting the sidelink data from the first UE to the at least one second UE within the search space, comprises:
   transmitting a first portion of a physical sidelink shared channel (PSSCH) that is located within the search space allocated to the at least one second UE; and
   transmitting a second portion of the PSSCH that is located within the second space allocated to one or more UEs excluding the at least one second UE.
36. The method of any of preceding clauses, wherein configuring the search space for transmission of sidelink data to the one or more second UEs, comprises:
   determining a physical sidelink control channel (PSCCH) index that the at least one second UE should monitor, wherein the PSCCH index is determined based on a hashing function calculated using a sidelink identification (SL-ID).
37. The method of any of preceding clauses, wherein the SL-ID is one of the first UE's transmitter identification ("SL-Tx-ID"), the at least one second UE's receiver identification ("SL-Rx-UE ID") or a link identification between the first UE and the at least one second UE ("SL-Tx-Rx-Link ID").
38. The method of any of preceding clauses, wherein configuring the search space for transmission of sidelink data to the one or more second UEs, comprises:
   determining a physical sidelink control channel (PSCCH) index that the at least one second UE should monitor, wherein the PSCCH index is determined based on a hashing function calculated using a random number generator.
39. The method of any of preceding clauses, wherein the random number generator includes a seed and length value of PSCCH that is exchanged between the first UE and the at least one second UE, and
   wherein the first UE utilizes the seed and the length value for the hashing function to calculate the PSCCH index in order to identify the search space.
40. An apparatus for wireless communications, comprising:
   at least one processor;
   and memory coupled to the at least one processor, the memory including instructions executable by the at least one processor to cause the apparatus to:
      configure, at a first user equipment (UE), a search space for transmission of sidelink data to one or more second UEs, wherein the search space is a subset of subchannels from available subchannels; and
      transmit a sidelink data from the first UE to the at least one second UE within the search space configured by the first UE for the at least one second UE.
41. The apparatus of clause 40, wherein the search space is one or more of:
   a common search space (CSS) that is globally common for a plurality of sidelink UEs,
   a transmitter UE dependent CSS ("Tx-dependent CSS") that is configured based on the first UE's transmitter identification ("SL-Tx-ID"),
   sidelink configured CSS ("SL-configured CSS") that is transmitted by a transmitting UE ("Tx-UE") to a subset of UEs, wherein the SL-configured CSS is configured based on a seed selected by the Tx-UE, or
   a UE-specific search space (USS) configured for the at least one second UE, wherein the USS is hashed based on the at least one second UE's receiver identification ("SL-Rx-UE ID") or a link identification between the first UE and the second UE ("SL-Tx-Rx-Link ID").
42. The apparatus of clause 40 or 41, wherein the search space is allocated contiguous subchannels determined based on an offset of a reference point.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   detecting, at a first user equipment (UE), a sidelink transmission from at least one second UE;
   identifying a search space in available subchannels to decode based on the detection of the sidelink transmission, wherein the search space is a subset of subchannels from the available subchannels, and
   wherein the search space is two or more of:
      a common search space (CSS) that is globally common for a plurality of sidelink UEs,
      a transmitter UE dependent CSS ("Tx-dependent CSS") that is configured based on at least one second UE's transmitter identification ("SL-Tx-ID"),
      sidelink configured CSS ("SL-configured CSS") that is transmitted by a transmitting UE ("Tx-UE") to a subset of UEs, wherein the SL-configured CSS is configured based on a seed selected by the Tx-UE, or
      a UE-specific search space (USS) configured for the first UE, wherein the USS is hashed based on first UE's receiver identification ("SL-Rx-UE ID") or a link identification between the first UE and the second UE ("SL-Tx-Rx-Link ID"); and
   decoding sidelink data transmitted from the at least one second UE based on identification of the search space.

2. The method of claim 1, wherein the search space is allocated contiguous subchannels determined based on an offset of a reference point.

3. The method of claim 2, wherein decoding the sidelink data transmitted from the at least one second UE based on identification of the search space, comprises:
   decoding a physical sidelink shared channel (PSSCH) that is entirely within the search space allocated to the first UE.

4. The method of claim 2, wherein decoding the sidelink data transmitted from the at least one second UE based on identification of the search space, comprises:
   decoding a first portion of a physical sidelink shared channel (PSSCH) that is located within the search space allocated to the first UE; and
   decoding a second portion of the PSSCH that is located within the second space allocated to one or more UEs excluding the first UE.

5. The method of claim 1, wherein identifying the search space in the available subchannels, comprises:
   determining a physical sidelink control channel (PSCCH) index that the first UE monitors, wherein the PSCCH index is determined based on a hashing function calculated using a sidelink identification (SL-ID).

6. The method of claim 5, wherein the SL-ID is one of the second UE's transmitter identification ("SL-Tx-ID"), the first UE's receiver identification ("SL-Rx-UE ID") or a link identification between the first UE and the second UE ("SL-Tx-Rx-Link ID").

7. The method of claim 1, wherein identifying the search space in the available subchannels, comprises:
   determining a physical sidelink control channel (PSCCH) index that the first UE monitors, wherein the PSCCH index is determined based on a hashing function calculated using a random number generator.

8. The method of claim 7, wherein the random number generator includes a seed and length value of PSCCH that is exchanged between the first UE and the second UE, and
   wherein the first UE utilizes the seed and the length value for the hashing function to calculate the PSCCH index in order to identify the search space.

9. An apparatus for wireless communications, comprising:
   at least one processor;
   and memory coupled to the at least one processor, the memory including instructions executable by the at least one processor to cause the apparatus to:
      detect, at a first user equipment (UE), a sidelink transmission from at least one second UE;
      identify a search space in available subchannels to decode based on the detection of the sidelink transmission, wherein the search space is a subset of subchannels from the available subchannels, and
      wherein the search space is two or more of:
         a common search space (CSS) that is globally common for a plurality of sidelink UEs,
         a transmitter UE dependent CSS ("Tx-dependent CSS") that is configured based on at least one second UE's transmitter identification ("SL-Tx-ID"),
         sidelink configured CSS ("SL-configured CSS") that is transmitted by a transmitting UE ("Tx-UE") to a subset of UEs, wherein the SL-configured CSS is configured based on a seed selected by the Tx-UE, or
         a UE-specific search space (USS) configured for the first UE, wherein the USS is hashed based on first UE's receiver identification ("SL-Rx-UE ID") or a link identification between the first UE and the second UE ("SL-Tx-Rx-Link ID"); and
      decode sidelink data transmitted from the at least one second UE based on identification of the search space.

10. The apparatus of claim 9, wherein the search space is allocated contiguous subchannels determined based on an offset of a reference point.

11. The apparatus of claim 10, wherein the instructions executable by the at least one processor to cause the apparatus to decode the sidelink data transmitted from the at least one second UE based on identification of the search space, are further executable by the at least one processor to cause the apparatus to:
   decode a physical sidelink shared channel (PSSCH) that is entirely within the search space allocated to the first UE.

12. The apparatus of claim 10, wherein the instructions executable by the at least one processor to cause the apparatus to decode the sidelink data transmitted from the at least one second UE based on identification of the search space, are further executable by the at least one processor to cause the apparatus to:

decode a first portion of a physical sidelink shared channel (PSSCH) that is located within the search space allocated to the first UE; and
decode a second portion of the PSSCH that is located within the second space allocated to one or more UEs excluding the first UE.

13. The apparatus of claim 9, wherein the instructions executable by the at least one processor to cause the apparatus to identify the search space in the available subchannels are further executable by the at least one processor to cause the apparatus to:
determine a physical sidelink control channel (PSCCH) index that the first UE monitors, wherein the PSCCH index is determined based on a hashing function calculated using a sidelink identification (SL-ID).

14. The apparatus of claim 13, wherein the SL-ID is one of the second UE's transmitter identification ("SL-Tx-ID"), the first UE's receiver identification ("SL-Rx-UE ID") or a link identification between the first UE and the second UE ("SL-Tx-Rx-Link ID").

15. The apparatus of 10, wherein the instructions executable by the at least one processor to cause the apparatus to identify the search space in the available subchannels are further executable by the at least one processor to cause the apparatus to:
determine a physical sidelink control channel (PSCCH) index that the first UE monitors, wherein the PSCCH index is determined based on a hashing function calculated using a random number generator.

16. The apparatus of claim 15, wherein the random number generator includes a seed and length value of PSCCH that is exchanged between the first UE and the second UE, and
wherein the first UE utilizes the seed and the length value for the hashing function to calculate the PSCCH index in order to identify the search space.

17. A method for wireless communications, comprising:
configuring, at a first user equipment (UE), a search space for transmission of sidelink data to one or more second UEs, wherein the search space is a subset of subchannels from available subchannels, and
wherein the search space is two or more of:
a common search space (CSS) that is globally common for a plurality of sidelink UEs,
a transmitter UE dependent CSS ("Tx-dependent CSS") that is configured based on first UE's transmitter identification ("SL-Tx-ID"),
sidelink configured CSS ("SL-configured CSS") that is transmitted by a transmitting UE ("Tx-UE") to a subset of UEs, wherein the SL-configured CSS is configured based on a seed selected by the Tx-UE, or
a UE-specific search space (USS) configured for at least one second UE, wherein the USS is hashed based on at least one second UE's receiver identification ("SL-Rx-UE ID") or a link identification between the first UE and the second UE ("SL-Tx-Rx-Link ID"); and
transmitting a sidelink data from the first UE to the at least one second UE within the search space configured by the first UE for the at least one second UE.

18. The method of claim 17, wherein the search space is allocated contiguous subchannels determined based on an offset of a reference point.

19. The method of claim 18, wherein transmitting the sidelink data from the first UE to the at least one second UE within the search space, comprises:

transmitting a physical sidelink shared channel (PSSCH) that is entirely within the search space allocated to the at least one second UE.

20. The method of claim 18, wherein transmitting the sidelink data from the first UE to the at least one second UE within the search space, comprises:
transmitting a first portion of a physical sidelink shared channel (PSSCH) that is located within the search space allocated to the at least one second UE; and
transmitting a second portion of the PSSCH that is located within the second space allocated to one or more UEs excluding the at least one second UE.

21. The method of claim 17, wherein configuring the search space for transmission of sidelink data to the one or more second UEs, comprises:
determining a physical sidelink control channel (PSCCH) index that the at least one second UE should monitor, wherein the PSCCH index is determined based on a hashing function calculated using a sidelink identification (SL-ID).

22. The method of claim 21, wherein the SL-ID is one of the first UE's transmitter identification ("SL-Tx-ID"), the at least one second UE's receiver identification ("SL-Rx-UE ID") or a link identification between the first UE and the at least one second UE ("SL-Tx-Rx-Link ID").

23. The method of claim 17, wherein configuring the search space for transmission of sidelink data to the one or more second UEs, comprises:
determining a physical sidelink control channel (PSCCH) index that the at least one second UE should monitor, wherein the PSCCH index is determined based on a hashing function calculated using a random number generator.

24. The method of claim 23, wherein the random number generator includes a seed and length value of PSCCH that is exchanged between the first UE and the at least one second UE, and
wherein the first UE utilizes the seed and the length value for the hashing function to calculate the PSCCH index in order to identify the search space.

25. An apparatus for wireless communications, comprising:
at least one processor;
and memory coupled to the at least one processor, the memory including instructions executable by the at least one processor to cause the apparatus to:
configure, at a first user equipment (UE), a search space for transmission of sidelink data to one or more second UEs, wherein the search space is a subset of subchannels from available subchannels, and
wherein the search space is two or more of:
a common search space (CSS) that is globally common for a plurality of sidelink UEs,
a transmitter UE dependent CSS ("Tx-dependent CSS") that is configured based on first UE's transmitter identification ("SL-Tx-ID"),
sidelink configured CSS ("SL-configured CSS") that is transmitted by a transmitting UE ("Tx-UE") to a subset of UEs, wherein the SL-configured CSS is configured based on a seed selected by the Tx-UE, or
a UE-specific search space (USS) configured for the at least one second UE, wherein the USS is hashed based on at least one second UE's receiver identification ("SL-Rx-UE ID") or a link identification between the first UE and the second UE ("SL-Tx-Rx-Link ID"); and transmit a sidelink data from the first UE to the at least one second UE within the search space configured by the first UE for the at least one second UE.

26. The apparatus of claim 25, wherein the search space is allocated contiguous subchannels determined based on an offset of a reference point.

* * * * *